United States Patent [19]

Feifel

[11] 4,305,177
[45] Dec. 15, 1981

[54] HINGE ASSEMBLY FOR CONTROLLABLE SURFACES

[75] Inventor: Winfried M. Feifel, Redmond, Wash.

[73] Assignee: The Boeing Company, Seattle, Wash.

[21] Appl. No.: 98,281

[22] Filed: Nov. 28, 1979

[51] Int. Cl.³ .......................... E05D 3/04; B64C 9/02
[52] U.S. Cl. .................................... 16/162; 114/274; 244/213; 244/215; 244/131; 403/292
[58] Field of Search ................................ 244/213–215, 244/219, 131, 90 R; 160/116, 229; 16/162, 169, 164, 168; 49/128 R, 371; 29/11; 114/274, 280, 281; 403/154, 155, 316, 292, 294; 108/3, 69

[56] References Cited

U.S. PATENT DOCUMENTS

| | | | |
|---|---|---|---|
| 619,356 | 2/1899 | Shannon | 16/162 |
| 1,846,965 | 2/1932 | Hall | 244/90 R |
| 1,911,121 | 5/1933 | Kerr et al. | 16/128 R |
| 2,076,150 | 4/1937 | Klein | 244/215 |
| 2,127,864 | 8/1938 | Girard | 244/90 R |
| 2,152,029 | 3/1939 | Cone | 244/90 R |
| 2,295,306 | 9/1942 | Tampier | 244/215 |
| 2,329,133 | 9/1943 | Peed, Jr. | 244/215 |
| 2,850,340 | 9/1958 | Brill | 403/154 |
| 3,140,066 | 7/1964 | Sutton et al. | 244/215 |
| 3,655,149 | 4/1972 | Williams | 244/215 |
| 3,883,093 | 5/1975 | Violleau | 244/215 |
| 4,213,587 | 7/1980 | Roeseler et al. | 244/213 |

Primary Examiner—Galen L. Barefoot
Attorney, Agent, or Firm—Kenneth W. Thomas; J. Peter Mohn; William C. Anderson

[57] ABSTRACT

A hinge assembly between a lifting foil (12) and an associated flap (14) wherein the flap (14) includes a series of sections (20, 22). In one embodiment, each section (20,22) may be rotatably mounted by a single hinge (24) to the foil (12) and interconnected by a coupling device (34) to an adjacent flap section. Additionally, a shear key coupling device (40) may be arranged between each pair of sections (20, 22) substantially extending to the trailing edge of each section (20, 22).

9 Claims, 4 Drawing Figures

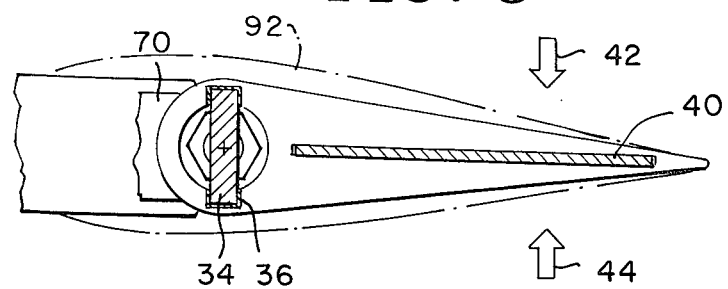
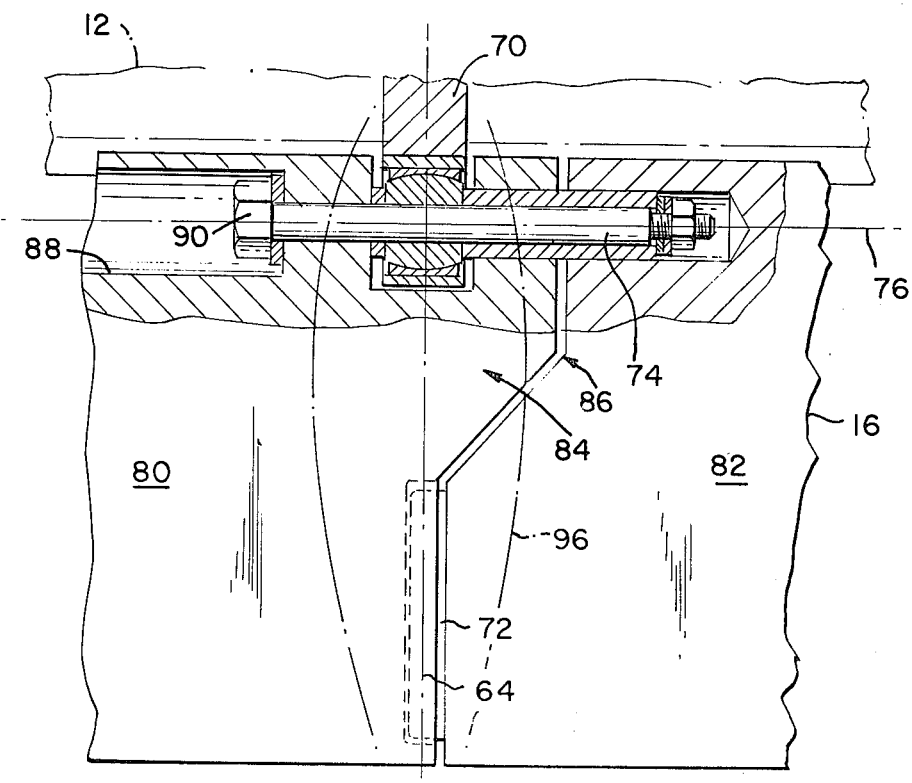

HINGE ASSEMBLY FOR CONTROLLABLE SURFACES

BACKGROUND OF THE INVENTION

The U.S. Government has rights in this invention pursuant to Contract No. N00024-76-C-2024 awarded by the Department of Defense, U.S. Navy.

TECHNICAL FIELD

The present invention relates to a hinge arrangement utilizable between a lifting foil and a sectionalized flap and, more particularly, to a hinge arrangement employing at least one hinge between each foil and flap section and a coupling device such as a shear key or a shear pin between adjacent sections.

CROSS REFERENCE TO RELATED APPLICATIONS

The subject matter of this application is related to the subject matter of U.S. application Ser. No. 966,529 filed Dec. 4, 1978 (now U.S. Pat. No. 4,213,587) by Roeseler et al and assigned to the same assignee.

BACKGROUND OF THE INVENTION

In a conventional hinge assembly or arrangement disposed between a wing or a lifting foil and its associated elongated controllable flap surfaces, the flap surfaces are supported by two or more hinges which are mounted between the foil and the flap surfaces. In many applications, the elongated flap surfaces are segmented or sectionalized into a plurality of sections in order to prevent binding of the hinges, particularly in the center portion of the flap surfaces, due to bending loads which are experienced during flight. These flap sections are interconnected so that a universal pivotal movement of the complete flap structure may be effectuated. Since each section is supported by at least two or more hinge assemblies a number of undesirable stress concentrations are experienced at fastener holes of the hinge assemblies requiring a manufacturing process dictating precise and accurate tolerances.

Also, if the axis of the hinge is close to or parallel to the foil skin, either at the upper or lower foil skin surface, a beefed up structure of a bulging structure is needed at the skin side to enable a specific rotating arc of the flap surface. Such an extended bulge or mounting is undesirable from a drag viewpoint.

It will be evident, therefore, that an elimination of a number of hinges would be economical and would reduce the stress concentration points, drag, and maintenance and inspection time associated with the hinge assembly.

BRIEF SUMMARY OF THE INVENTION

It is an object of the invention to provide for a minimum number of hinge components between a foil and an interconnected flap.

It is another object of the present invention to provide for a coupling between flap segments which provide for unbinded hinge rotation between foil and flap segments wherein the segments are capable of moving universally.

Briefly, in one embodiment, the present invention discloses a hinge assembly for pivotally coupling a first structural member to a second structural member wherein the second structural member is composed of a plurality of sections arranged seriatim. The invention provides a mounting means for attaching each of the sections to the first member wherein the mounting means has an axis of rotation. A first and a second coupling means is juxtaposed between each of the sections for pivotally interconnecting the sections. Both the first and the second coupling means are disposed substantially perpendicular to the axis of rotation while the second coupling means is substantially in alignment with the axis of rotation.

In a second embodiment, both the first and second coupling means are in alignment with a central axis passing through the mounting means. The first coupling means is disposed substantially perpendicular to the axis of rotation and the second coupling means is substantially in alignment with the axis of rotation. The second embodiment is particularly useful when a reduction in drag is desired.

The teachings of the present invention intend to reduce the above disadvantages by approximately 50%.

Accordingly, the present invention is directed to a hinge assembly between a lifting foil and a segmented or sectionalized flap wherein the usual paired hinge mountings per flap are converted to one hinge, i.e., each flap section is carried by a single hinge between foil and section. A coupling device such as a pin or a shear key is located between a pair of adjacent sections providing a coupling between the sections and allowing a universal rotation of the sectionalized flap while retaining the flexibility of the overall flap arrangement.

The invention provides for a more efficient and economic design and manufacture of coupling restraining hinge assemblies for control sufaces. In one embodiment the hinge assemblies between a foil and a flap supports every adjacent section along the flap allowing a universal movement of the sections about an elongated axis. The invention comprises a spherical hinge mounted on a wing or a foil for each section. The hinge is connected to an adjacent section by means such as a pivot pin or a vertical shear key which is juxtaposed between the adjacent sections.

For example, the pivot pin extends through the hinge from a first section into the adjacent section and is received in a socket, therein. In the case of a vertical shear key the socket in the next section is replaced by a vertical shear key which is interfitted in a slot in the first section. The vertical shear key preferably extends coaxially with the hinge pin.

In addition, the present invention also comprises a restraining or a horizontal shear key disposed proximate the trailing edge of a section which interconnects adjacent sections. The horizontal shear key is mounted at a predetermined distance from the hinge pin in order to obtain an efficient leverage thereby allowing the sections to move as one flap surface while maintaining flexibility of movement along a longitudinal direction of the flap surfaces.

The present invention is particularly important and useful in hydrofoil craft rather than aircraft since the various loads experienced by a hydrofoil craft in a liquid are many times higher than those experienced in a gas medium by an aircraft or the like.

Other objects and advantages of the present invention will be apparent from a perusal of the detailed description which follows.

BRIEF DESCRIPTION OF THE DRAWINGS

FIG. 3 is a section taken on the line 3—3 of FIG. 2.

FIG. 4 is an enlarged partial plan view of the second embodiment of a hinging arrangement for connecting movable control surfaces to the foil as indicated on the starboard side of FIG. 1.

DETAILED DESCRIPTION OF THE INVENTION

The present invention is particularly useful with hydrofoil technology. Consequentially, the improved hinge assembly of the present invention has been illustrated with respect to a forward foil and flap system on the forward strut of a typical hydrofoil vessel utilizing the well-known "Canard" submerged wing concept.

A vertically positioned forward strut 10 of a conventional hydrofoil vessel is provided with a horizontally mounted foil 12 which extends between the port and the starboard sides of the vessel. The foil may be hingeably mounted to a flap 14 on port and a flap 16 on starboard. Conventionally each flap comprises a plurality of sections with each section being vertically supported on the foil 12 by a pair of hinges. The present invention uses a similar arrangement, as illustrated in FIG. 1, with the exception that only one hinge per section is utilized as a mount between the foil 12 and each flap section.

Figure 2:
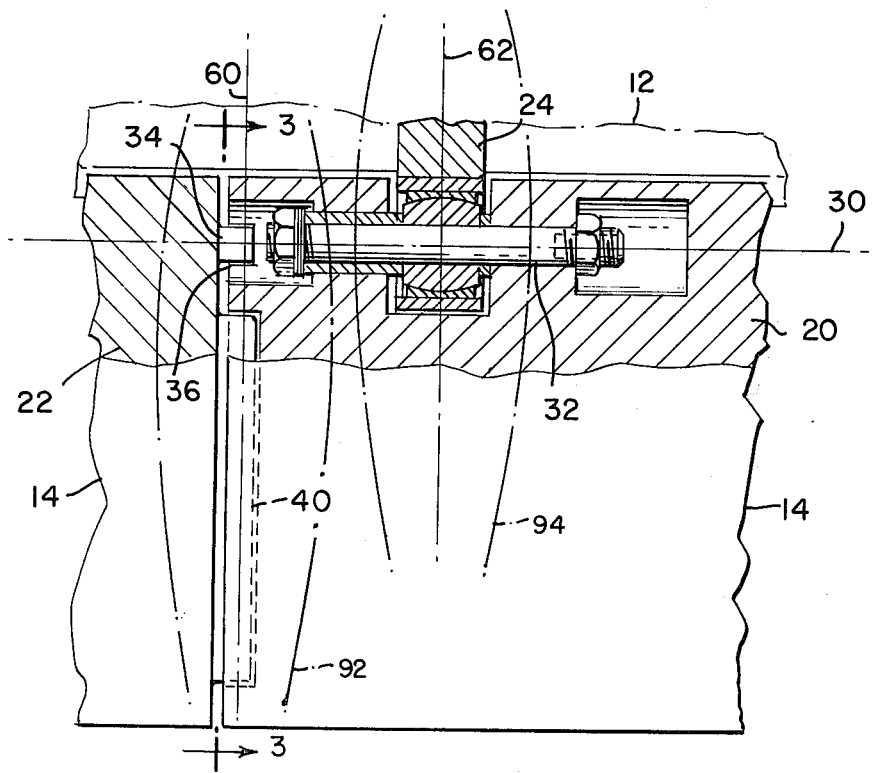
FIG. 2 is an enlarged partial plan view of the first embodiment as indicated on the port side of FIG. 1.

Referring now to FIG. 2, a flap section 20 is illustrated as being supported by a conventional hinge 24 on the foil 12. The hinge 24 comprises a hinge pin 32 having a central axis 30. Another flap section 22 is coupled to the section 20 along the axis 30 by a vertically elongated, substantially rectangular, shear key pin 34 which extends from the section 22 into a socket 36 provided in the section 20. FIG. 3 depicts a horizontally elongated substantially rectangular fitting plug or a shear key 40 that maintains the section 22 in alignment with the section 20 along the axis 30 and simultaneously assures flexibility between the sections 20 and 22 along an axis 60. As can be seen from FIG. 2, the vertical shear pin 34 and the horizontal shear key 40 are positioned substantially perpendicularly to one another.

This unique shear pin 34 and shear key 40 interconnection between the sections 22-20 substantially precludes forward, aft, up or down movement of the individual sections. Vertical shear loads, experienced by the foil 12 and the flaps 14, 16 along the directions 42 and 44 (see FIG. 3), tend to bend the foil and the flaps. However, with the present hinge assemblies these loads will not cause binding between the foil and the flap sections.

Figure 1:
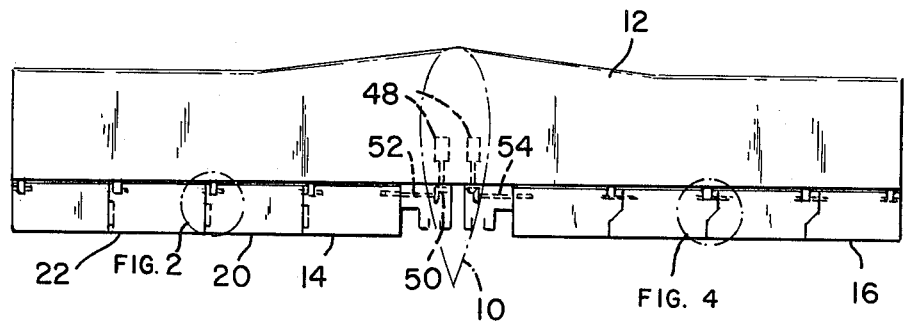
FIG. 1 is a plan view of a typical foil and flap structure used on the forward strut of a hydrofoil craft incorporating the present invention. A first and a second preferred embodiment of hinge assemblies are illustrated at the port and starboard sides of the craft, respectively.

Further clarification can be obtained through reference to FIG. 1 wherein a rotation of the flaps 14 and 16 along the axis 30 may be achieved by a pair of servo mechanisms 48 installable in the strut 10. The servo mechanisms are capable of rotating the flaps 14 and 16 through a conventional gear mechanism 50 via a pair of couplings 52 and 54, respectively.

The second preferred embodiment of the present invention is illustrated in more detail in FIG. 4. In FIG. 2, the flexibility between the sections 20-22 of the flap 14 occurred over the horizontal axis 60 and another axis 62. However a heavy load is carried over the center line 60 within FIG. 2 and absorbed in the key 40. Accordingly and disadvantageously, the hinge 24 requires substantial strength necessitating a beefed up or a local strengthing structure.

As a result, this reinforcing structure appears as a protrusion or a bulge 92 above and below the foil structure thereby increasing the drag of the foil-flap configuration. Additional drag-inducing structural strengthing is required at the center line 62 where a build-up or a bulge 94 would also appear (see FIG. 2). For clarity of illustration, or a bulge structure is shown using only phantom lines in FIGS. 2, 3 and 4.

In the second embodiment illustrated in FIG. 4, the hinge 70 is aligned with a central longitudinal axis 64 which also passes through a shear key 72 whereby the loads 42 and 44, which may occur when the bow of a hydrofoil dives or rises into heavy seas, may be divided over the hinge 70 and the associated shear key 72. As a consequence, only a single bulge 96 will occur in the second embodiment resulting in less drag. As can be clearly seen from FIG. 4, a pair of flap sections 80, 82 are disposed side by side along an axis of rotation 76. The section 80 is provided with an extension or a protrusion 84 which is matched in shape by a recession or a depression 86 in the section 82. The significance of this dog-leg flap configuration will become clear shortly.

As a substitute for a shear pin comparable to the shear pin 34, a hinge pin 74 forms a connection between the sections 80, 82 disposed along the axis of rotation 76. As shown in FIG. 4, the connection is completed by fastening an end of the pin 34 within a cavity 88 formed in the section 80 using a nut 90.

Of course, it should be realized that the arrangement in FIG. 4 has the disadvantage that if the hinge 70 is not located close to an adjacent section a long hinge pin 74 must be utilized, which would also become disadvantageous from a flexibility viewpoint. On the other hand, the dog-leg flap configuration of FIG. 4 makes it possible to have the hinge 70 and shear key 72 be in alignment along the axis 64 and allows the use of a single bulge or strengthening construction 96 in the main foil 12 and the flaps 16 thereby reducing drag and providing a more economic manufacturing process.

Of course, it should be realized that the shear key 34 or the hingepin 74 arrangement illustrated in FIGS. 2 and 4 are interchangeable.

Although in the foregoing specification the instant invention has been described in conjunction with preferred embodiments, many variations and modifications will now become apparent to those skilled in the art, and it is preferred, therefore, that the instant invention be limited not by the specific disclosure contained herein but only by the appended claims.

The embodiments of the invention are defined hereinafter.

Now, therefore I claim:

1. A hinge assembly for pivotally coupling a first structural member to a second structural member wherein said second structural member is composed of a plurality of sections arranged seriatim, comprising:

means for mounting each of said sections to said first member, said mounting means having an axis of rotation;

a first coupling means juxtaposed between each of said sections for pivotally interconnecting said sections, said first coupling means being disposed substantially perpendicular to said axis of rotation;

a second coupling means juxtaposed between each of said sections for pivotally interconnecting said sections, said second coupling means being disposed substantially perpendicular to both said axis of rotation and said first coupling means, said second coupling means being substantially in alignment with said axis of rotation.

2. The hinge assembly of claim 1, wherein said second coupling means comprises a vertical shear key depending from one section and a recess formed in an adjacent section, said shear key extending from said one section into said recess.

3. The hinge assembly of claim 2, wherein said shear key is an elongated rectangular bar.

4. The hinge assembly of claims 1 or 2, wherein said mounting means has a central axis, both said first and said second coupling means having a central axis and wherein the central axis of both said first and said second coupling means is offset from the central axis of said mounting means.

5. A hinge assembly for pivotally coupling a first structural member to a second structural member wherein said second structural member is composed of a plurality of sections arranged seriatim, comprising:

means for mounting each of said sections to said first member, said mounting means having an axis of rotation and a central axis;

a first coupling means juxtaposed between each of said sections for pivotally interconnecting said sections, said first coupling means being disposed substantially perpendicular to said axis of rotation and substantially in alignment with said central axis;

a plurality of second coupling means for pivotally interconnecting said sections, each of said second coupling means being disposed in one of said sections and extending to an adjacent section for pivotally coupling said adjacent section to said one section, said second coupling means being substantially in alignment with said axis of rotation.

6. The hinge assembly of claim 5, wherein said second coupling means comprises a hinge pin extending from said one section to said adjacent section, said one section and said adjacent section having cavities and means for fixing each distal end of said hinge pin within each of said cavities.

7. The hinge assembly of claim 6, wherein said one section is provided with an extension projecting towards said adjacent section, said adjacent section having a recessed portion, said extension being interfitted within said recessed portion.

8. The hinge assembly of claim 7, wherein said mounting means is located within said extension.

9. The hinge assembly of claims 5 or 8, wherein said central axis lies proximate a plane defined between adjacent sections.

* * * * *